(12) United States Patent
Omori et al.

(10) Patent No.: US 7,645,849 B2
(45) Date of Patent: *Jan. 12, 2010

(54) CLEANING BLADE MEMBER

(75) Inventors: Masahiro Omori, Yokohama (JP); Shuji Abe, Yokohama (JP)

(73) Assignee: Synztec Co., Ltd., Tokyo (JP)

( * ) Notice: Subject to any disclaimer, the term of this patent is extended or adjusted under 35 U.S.C. 154(b) by 513 days.

This patent is subject to a terminal disclaimer.

(21) Appl. No.: 11/147,519

(22) Filed: Jun. 8, 2005

(65) Prior Publication Data

US 2005/0268424 A1  Dec. 8, 2005

(30) Foreign Application Priority Data

Jun. 8, 2004  (JP) .............................. 2004-169574

(51) Int. Cl.
- *C08G 18/32* (2006.01)
- *C08G 18/40* (2006.01)
- *C08G 18/44* (2006.01)
- *C08G 18/65* (2006.01)
- *G03G 21/00* (2006.01)

(52) U.S. Cl. .............................. 528/60; 528/65; 528/80; 528/85; 399/350

(58) Field of Classification Search .................... 528/80, 528/83, 65, 85, 60; 399/350
See application file for complete search history.

(56) References Cited

U.S. PATENT DOCUMENTS

| | | | |
|---|---|---|---|
| 5,070,173 A * | 12/1991 | Yokota et al. | 528/85 |
| 5,510,887 A * | 4/1996 | Watabe et al. | 399/350 |
| 5,765,088 A * | 6/1998 | Nakayama et al. | 399/350 |
| 2002/0037990 A1* | 3/2002 | Hitoshi et al. | 528/80 |

FOREIGN PATENT DOCUMENTS

| | | | |
|---|---|---|---|
| EP | 0 535 875 | * | 4/1993 |
| JP | 9-274416 | | 10/1997 |
| JP | 2001-265190 | * | 9/2001 |

OTHER PUBLICATIONS

Oertel, Gunter. Polyurethane Handbook: Chemistry—Raw Materials—Processing—Reactions—Properties. Hanser Gardner Publications, New York, 1985.*

* cited by examiner

*Primary Examiner*—Vasu Jagannathan
*Assistant Examiner*—Benjamin Gillespie
(74) *Attorney, Agent, or Firm*—Brian A. Gomez; Gomez International Patent Office, LLC

(57) ABSTRACT

A cleaning blade member comprising a polyurethane formed by using a polyol consisting essentially of a polycarbonate-diol, a polyisocyanate, and a crosslinking agent containing a short chain diol and a triol, the polyurethane having a tensile strength at 60° C. of 200 kg/cm² or higher, and a tensile strength retention ΔT, represented by the following equation, of 40% or more:

$$\Delta T(\%) = T_{60}/T_{10} \times 100$$

where $T_{10}$ denotes a tensile strength at 10° C., and $T_{60}$ denotes the tensile strength at 60° C.

9 Claims, No Drawings

CLEANING BLADE MEMBER

BACKGROUND OF THE INVENTION

1. Field of the Invention

This invention relates to a cleaning blade member. More particularly, the present invention relates to a cleaning blade member for removing a toner present on a toner image bearing body, on which a toner image is formed for subsequent transfer to a transfer material, such as a photoconductor or a transfer belt in electrophotography.

2. Description of the Related Art

In the electrophotographic process, a cleaning blade for removing a toner is generally employed for repeated use of an electrophotographic photoconductor or a transfer belt. As a cleaning blade member, polyurethane is used, because polyurethane has satisfactory wear resistance, has sufficient mechanical strength without addition of a reinforcing agent, and is non-polluting. However, the physical properties of polyurethane are known to be temperature-dependent, thereby posing the problem that at high temperatures, the cleaning blade wears.

Among cleaning blades comprising polyurethane is a cleaning blade composed of cured polyurethane having a tensile strength at 50° C. of 12 MPa or more, a tan δ peak temperature of 15° C. or lower, and a hardness of 80° or less. Such a cleaning blade under development is aimed at effectively preventing the chipping of an edge portion in a high temperature environment and showing satisfactory cleaning properties in a broad temperature range, without impairing cleaning properties in a low temperature environment (see Japanese Patent Application Laid-Open No. 2001-265190).

Also available is a blade for an electrophotographic apparatus, which uses a polyurethane sheet obtained by mixing a bifunctional polyol having a number average molecular weight of 1,000 to 3,000 and a trifunctional polyol having a number average molecular weight of 92 to 980 at such a ratio as to provide an average functional group number of 2.02 to 2.20, thereby forming a mixed polyol, mixing a diisocyanate compound having an isocyanate group content of 5 to 20% with the mixed polyol to form a prepolymer, mixing a crosslinking agent, in such an amount as to provide an OH group/NCO group equivalent ratio of 0.90 to 1.05, and a reaction accelerator, in an amount of 0.01 to 1.0 part by weight based on 100 parts by weight of the prepolymer, with the prepolymer, and reacting the mixture (see Japanese Patent Application Laid-Open No. 1997-274416).

However, these blades are not satisfactory, particularly, in terms of wear resistance in a high temperature environment, and further improvements in their properties are desired.

The present invention has been accomplished in light of the above-described circumstances. An object of the present invention is to provide a cleaning blade member excellent in wear resistance even in a high temperature environment.

SUMMARY OF THE INVENTION

A first aspect of the present invention for attaining the above object is a cleaning blade member comprising a polyurethane formed by using a polyol consisting essentially of a polycarbonatediol, a polyisocyanate, and a crosslinking agent containing a short chain diol and a triol, the polyurethane having a tensile strength at 60° C. of 200 kg/cm² or higher, and a tensile strength retention ΔT, represented by the following equation, of 40% or more:

$$\Delta T(\%) = T_{60}/T_{10} \times 100$$

where $T_{10}$ denotes a tensile strength at 10° C., and $T_{60}$ denotes the tensile strength at 60° C.

A second aspect of the present invention is the cleaning blade member according to the first aspect, characterized in that the polyurethane has a tensile strength at 300% elongation at 60° C. of 200 kg/cm² or higher.

A third aspect of the present invention is the cleaning blade member according to the first or second aspect, characterized in that the polyurethane has a peak temperature at tan δ (1 Hz) of 10° C. or lower.

A fourth aspect of the present invention is the cleaning blade member according to any one of the first to third aspects, characterized in that the short chain diol and the triol are at such a weight ratio that the short chain diol:triol=50:50 to 95:5.

A fifth aspect of the present invention is the cleaning blade member according to any one of the first to fourth aspects, characterized by having an α value of 0.7 to 1.0.

A sixth aspect of the present invention is the cleaning blade member according to any one of the first to fifth aspects, characterized by further using a curing retarder.

According to the present invention, a cleaning blade member excellent in wear resistance even in a high temperature environment (60° C.) and usable for a long term can be constituted of a polyurethane having a predetermined tensile strength with the use of a polycarbonatediol.

DETAILED DESCRIPTION OF THE INVENTION

A cleaning blade member according to the present invention will now be described in detail by embodiments.

The present invention is based on the following findings: The cleaning blade member of the present invention comprises a polyurethane formed by using a polyol consisting essentially of a polycarbonatediol, a polyisocyanate, and a crosslinking agent containing a short chain diol and a triol. The polyurethane has a tensile strength at 60° C. of 200 kg/cm² or higher, preferably, 250 kg/cm² or higher, and has a tensile strength retention ΔT, represented by the aforementioned equation, of 40% or more, when the tensile strength at 10° C. is designated as $T_{10}$, and the tensile strength at 60° C. is designated as $T_{60}$. Because of these features, the cleaning blade member has excellent wear resistance even at high temperatures, and its long life can be ensured. If the tensile strength at 60° C. is less than 200 kg/cm², or the ΔT is less than 40%, the wear resistance worsens.

The method of forming the polyurethane having the predetermined tensile strength is not limited. For example, such a polyurethane can be formed by increasing the proportion of the triol in the crosslinking agent, or increasing the proportion of the polyisocyanate incorporated.

Preferably, the polyurethane is formed by using a curing retarder. This is because the polycarbonatediol quickly reacts, and the use of a curing retarder lengthens its pot life, thus improving its workability and stabilizing its quality. No limitation is imposed on the curing retarder, but phosphates such as monobutyl phosphate and catalysts with retardant activity, such as amine-based compounds, can be named. The proportion of the curing retarder is not limited, but the curing retarder is preferably used in an amount of 0.01 to 1 part by weight based on 100 parts by weight of the polyol.

The polyurethane preferably has a tensile strength at 300% elongation at 60° C. of 200 kg/cm² or higher. If this tensile strength is less than 200 kg/cm², the wear resistance is so poor that after passage of a small number of transfer sheets, the edge of the cleaning blade chips, or an image failure, such as a white patch, occurs.

The polyurethane preferably has a peak temperature at tan δ (1 Hz) of 10° C. or lower. If the peak temperature is higher than 10° C., the rubbery nature is lost in a low temperature, low humidity environment, and the cleaning blade is very liable to chipping.

The permanent elongation of the polyurethane is preferably 2.5% or less. If the permanent elongation is greater than 2.5%, the permanent set of the edge portion of the cleaning blade during use is so great that the linear pressure drops, thereby deteriorating the cleaning performance.

The cleaning blade member of the present invention is formed by using a polyol consisting essentially of a polycarbonatediol, a polyisocyanate, and a crosslinking agent containing a short chain diol and a triol. Polycarbonatediol is used as the polyol. The polycarbonatediol is obtained by reacting a diol component and a dialkyl carbonate. The diol component (base diol) is not limited, but includes, for example, butanediol, pentanediol, hexanediol (HD), methylpentanediol, nonanediol (ND), and methyloctanediol (MOD). Two or more of these diols may be used as a mixture.

In the present invention, a polyol other than the polycarbonatediol can be used concomitantly in such a range as not to impair the effect of the present invention. If the concomitant use is effected, the content of the polycarbonatediol in the polyol is 100 to 30% by weight. Examples of the other polyol are polyesterpolyols obtained by dehydration condensation between a dibasic acid, such as adipic acid, and the same diol component as described above, and caprolactone-based polyols.

The proportion of the polyol incorporated is preferably 60 to 80% by weight in the polyurethane.

The polyisocyanate to be reacted with the polyol is preferably that having a molecular structure which is relatively not rigid. Examples of the polyisocyanate are 4,4'-diphenylmethane diisocyanate (MDI), 2,6-toluene diisocyanate (TDI), and 1,6-hexane diisocyanate (HDI). Particularly preferred is MDI. The proportion of the polyisocyanate incorporated is preferably 30 to 80 parts by weight based on 100 parts by weight of the polyurethane. If the proportion is less than 30 parts by weight, insufficient tensile strength may result. If the proportion is more than 80 parts by weight, the peak temperature at tan δ is too high, or the permanent elongation is too great.

The α value is preferably 0.7 to 1.0. The α value is a value represented by the equation described below. If the α value is larger than 1.0, the hydroxyl groups of the crosslinking agent remain, so that the photoconductor or the like in contact with the cleaning blade is contaminated. If the α value is smaller than 0.7, the crosslinking density is too low, thus resulting in insufficient strength, or deactivation of the remaining isocyanate may take time, contaminating the photoconductor.

α value=(Number of moles of the hydroxyl groups of the crosslinking agent)/(Number of moles of the isocyanate groups remaining after the reaction between the polyol and the polyisocyanate)

There is no limitation on the short chain diol, but it is preferred that at least one of propanediol (PD) and butanediol (BD) is present. Typically, the propanediol is 1,3-propanediol, and the butanediol is 1,4-butanediol. Although 1,3-propanediol and 1,4-butanediol are preferred in terms of performance and cost, they are not restrictive. Nor is any limitation imposed on the triol, and its examples include short chain triols such as trimethylolethane (TME) and trimethylolpropane (TMP), and caprolactone-based triols represented by the formula indicated below and having larger molecular weights than the short chain triols (i.e., triols synthesized from ε-caprolactone, for example, those with a number average molecular weight of 400 to 1,000). Of course, the short chain diol and the triol may each be a mixture of two or more of the above-mentioned diols and triols. The proportion of the essential components of the crosslinking agent incorporated is not limited, but it is preferred that the weight ratio of these components is short chain diol:triol=50:50 to 95:5. If the content of the triol is low, the permanent elongation will be too great. If the triol content is too high, the tan δ will increase excessively, and chipping will occur easily.

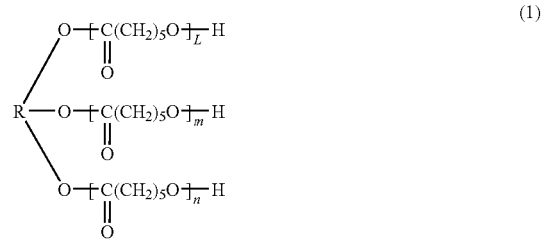

(1)

(R: alkyl)

The above-described polycarbonatediol and crosslinking agent are blended with the polyisocyanate and curing retarder, followed by reacting them, to produce polyurethane. The reaction can be performed using a general manufacturing method for polyurethane, such as the prepolymer process or the one-shot process. The prepolymer process is preferred for the present invention, since it obtains polyurethane excellent in strength and wear resistance. However, no limitation is imposed on the manufacturing method.

The present invention will now be described in further detail based on the following examples, which in no way limit the present invention.

Example 1

Polycarbonatediol (100 parts by weight) with a molecular weight of 2,000 using 1,6-hexanediol (1,6HD) as a base diol, 40 parts by weight of MDI, and a 1,3-propanediol/trimethylolethane mixture (80/20) as a crosslinking agent in such an amount as to give an α value of 0.95 were mixed. Further, 0.05 part by weight of MP-4 (monobutyl phosphate) of DAIHACHI CHEMICAL INDUSTRY was added as a curing retarder. The mixture was reacted to form a polyurethane, from which a test sample and a cleaning blade were produced. The content of the polycarbonatediol in the polyurethane was about 60% by weight.

Example 2

A test sample and a cleaning blade were produced in the same manner as in Example 1, except that a caprolactone-based triol having a molecular weight of 500 was used instead of the trimethylolethane.

Example 3

A test sample and a cleaning blade were produced in the same manner as in Example 1, except that a caprolactone-based triol having a molecular weight of 800 was used instead of the trimethylolethane.

Example 4

A test sample and a cleaning blade were produced in the same manner as in Example 1, except that a mixture of equal amounts of a polycarbonatediol with a molecular weight of 2,000 using 1,6-hexanediol as a base diol and a polyester diol with a molecular weight of 2,000 obtained from a 1,9-nonanediol/2-methyl-1,8-octanediol mixture and adipic acid was used instead of the polycarbonatediol.

Example 5

A test sample and a cleaning blade were produced in the same manner as in Example 4, except that a caprolactone-based triol having a molecular weight of 800 was used instead of the trimethylolethane, and that the amount of MDI was 50 parts by weight.

Example 6

A test sample and a cleaning blade were produced in the same manner as in Example 1, except that a mixture of equal amounts of a polycarbonatediol with a molecular weight of 2,000 using 1,6-hexanediol as a base diol and a poly-ε-caprolactone-based diol with a molecular weight of 2,000 was used instead of the polycarbonatediol, and that the amount of MDI was 50 parts by weight.

Example 7

A test sample and a cleaning blade were produced in the same manner as in Example 6, except that a caprolactone-based triol having a molecular weight of 800 was used instead of the trimethylolethane.

Comparative Example 1

A test sample and a cleaning blade were produced in the same manner as in Example 1, except that a poly-ε-caprolactone-based diol with a molecular weight of 2,000 was used instead of the polycarbonatediol, and that a 1,4-butanediol/trimethylolpropane mixture (80/20) was used instead of the 1,3-propanediol/trimethylolethane mixture (80/20).

Comparative Example 2

A test sample and a cleaning blade were produced in the same manner as in Example 1, except that a polyesterdiol with a molecular weight of 2,000 obtained from 1,9-nonanediol and adipic acid was used instead of the polycarbonatediol.

Comparative Example 3

A test sample and a cleaning blade were produced in the same manner as in Example 1, except that the amount of MDI was 35 parts by weight.

Test Example 1

The test samples of the Examples and the Comparative Examples were each measured at 23° C. for rubber hardness (Hs) in accordance with JIS K6253, Young's modulus in accordance with JIS K6254 at 25% elongation, tensile strength at 100% elongation (100% modulus), tensile strength at 200% elongation (200% modulus), tensile strength at 300% elongation (300% modulus), tensile strength and elongation at breakage in accordance with JIS K6251, tear strength in accordance with JIS K6252, and 100% permanent elongation in accordance with JIS6262, and also measured for rebound resilience (Rb) at 25° C. by Lupke rebound resilience tester in accordance with JIS K6255. The tan δ was measured at 1 Hz by Seiko Instruments' thermal analysis apparatus EXSTAR 6000 DMS Viscoelasticity Spectrometer to determine the peak temperature. Moreover, the tensile strength and the tensile strength at 300% elongation were also measured at 10° C. to 60° C. to evaluate their temperature dependence. The results are shown in Tables 1 and 2.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Composition | Polyol | A | 1,6-HD carbonate | 1,6-HD carbonate | 1,6-HD carbonate | 1,6-HD carbonate | 1,6-HD carbonate | 1,6-HD carbonate | 1,6-HD carbonate |
| | | B | — | — | — | 1,9-ND MOD adipate | 1,9-ND MOD adipate | Caprolactone | Caprolactone |
| | | Proportion | 100% | 100% | 100% | 50% | 50% | 50% | 50% |
| | Isocyanate (MDI) | Number of Parts | 40 | 40 | 40 | 40 | 50 | 50 | 50 |
| | Crosslinking agent | Diol | PD | PD | PD | PD | PD | PD | PD |
| | | Triol | TME | 500 | 800 | TME | 800 | TME | 800 |
| | | α value | 0.95 | 0.95 | 0.95 | 0.95 | 0.95 | 0.95 | 0.95 |
| General properties | Hardness | JIS A° | 76 | 74 | 73 | 74 | 76 | 77 | 75 |
| | Rebound resilience (25° C.) | % | 14 | 17 | 24 | 29 | 28 | 20 | 35 |
| | Young's Modulus | Kg/cm² | 80 | 77 | 69 | 80 | 86 | 91 | 78 |
| | 100% Modulus | Kg/cm² | 70 | 60 | 50 | 60 | 80 | 80 | 60 |
| | 200% Modulus | Kg/cm² | 200 | 155 | 110 | 130 | 160 | 180 | 120 |
| | 300% Modulus | Kg/cm² | ** | ** | 370 | 330 | 380 | 440 | 280 |
| | Tensile strength | Kg/cm² | 480 | 530 | 550 | 490 | 560 | 530 | 470 |
| | Elongation | % | 280 | 300 | 330 | 330 | 330 | 320 | 330 |
| | Tear strength | kg/cm | 85 | 75 | 70 | 60 | 66 | 71 | 64 |
| | 100% permanent elongation | % | 2.0 | 1.6 | 1.9 | 1.3 | 1.5 | 1.7 | 1.4 |
| | tan δ peak (1 Hz) | ° C. | 11 | 4 | −1 | −2 | −7 | 6 | −6 |
| Temperature dependence | 300% Modulus (kg/cm²)* | 10° C. | ** | ** | 508 | 543 | 623 | 591 | 495 |
| | | 20° C. | ** | ** | 463 | 473 | 509 | 525 | 444 |
| | | 30° C. | ** | 463 | 355 | 396 | 428 | 511 | 386 |
| | | 40° C. | ** | 399 | 314 | 332 | 385 | 487 | 332 |

TABLE 1-continued

|  |  |  | Ex. 1 | Ex. 2 | Ex. 3 | Ex. 4 | Ex. 5 | Ex. 6 | Ex. 7 |
|---|---|---|---|---|---|---|---|---|---|
|  |  | 50° C. | 384 | 332 | 225 | 285 | 311 | 400 | 270 |
|  |  | 60° C. | 250 | 235 | 204 | 242 | 263 | 296 | 232 |
|  |  | Retention | — | — | 40% | 45% | 42% | 50% | 47% |
|  | Tensile strength | 10° C. | 500 | 573 | 508 | 610 | 705 | 616 | 594 |
|  | (kg/cm²) | 20° C. | 479 | 519 | 489 | 536 | 642 | 589 | 542 |
|  |  | 30° C. | 462 | 456 | 378 | 524 | 577 | 583 | 510 |
|  |  | 40° C. | 402 | 398 | 387 | 494 | 524 | 558 | 430 |
|  |  | 50° C. | 334 | 307 | 288 | 368 | 438 | 521 | 388 |
|  |  | 60° C. | 282 | 274 | 270 | 327 | 385 | 382 | 293 |
|  |  | ΔT | 56% | 48% | 53% | 54% | 55% | 62% | 49% |
| Acceleration | Wear width (μm) |  | 0 | 5~10 | 5~10 | ≤5 | 5~10 | ≤5 | 5~10 |
| test | Chipping |  | Fine | None | None | None | None | None | None |
|  | Edge condition |  | *** | Good | Good | Good | Good | Good | Good |

*Retention (%) = (300% Modulus at 60° C./300% Modulus at 10° C.) × 100
**: Not measured, because breakage occurred before elongation of up to 300%.
***: Slight chipping occurred, but no wear was observed.

TABLE 2

|  |  |  | Comp. Ex. 1 | Comp. Ex. 2 | Comp. Ex. 3 |
|---|---|---|---|---|---|
| Composition | Polyol | A | Caprolactone | 1,6-HD adipate | 1,6-HD carbonate |
|  |  | B | — | — | — |
|  |  | Proportion | 100% | 100% | 100% |
|  | Isocyanate (MDI) | Number of Parts | 50 | 40 | 35 |
|  | Crosslinking agent | Diol | BD | PD | PD |
|  |  | Triol | TMP | TME | TME |
|  | α value |  | 0.95 | 0.95 | 0.95 |
| General | Hardness | JIS A° | 77 | 75 | 67 |
| properties | Rebound resilience (25° C.) | % | 51 | 53 | 20 |
|  | Young's Modulus | Kg/cm² | 87 | 81 | 57 |
|  | 100% Modulus | Kg/cm² | 40 | 60 | 40 |
|  | 200% Modulus | Kg/cm² | 80 | 40 | 100 |
|  | 300% Modulus | Kg/cm² | 150 | 230 | 280 |
|  | Tensile strength | Kg/cm² | 340 | 400 | 450 |
|  | Elongation | % | 330 | 360 | 330 |
|  | Tear strength | kg/cm | 70 | 90 | 60 |
|  | 100% permanent elongation | % | 2.2 | 1.5 | 1.8 |
|  | tan δ peak (1 Hz) | ° C. | −6 | −12 | 4 |
| Temperature | 300% Modulus (kg/cm²)* | 10° C. | 427 | 394 | 483 |
| dependence |  | 20° C. | 335 | 330 | 378 |
|  |  | 30° C. | 277 | 292 | 285 |
|  |  | 40° C. | 238 | 243 | 248 |
|  |  | 50° C. | 203 | 206 | 211 |
|  |  | 60° C. | 165 | 150 | 180 |
|  |  | Retention | 39% | 38% | 37% |
|  | Tensile strength (kg/cm²) | 10° C. | 626 | 467 | 552 |
|  |  | 20° C. | 535 | 466 | 438 |
|  |  | 30° C. | 479 | 430 | 355 |
|  |  | 40° C. | 400 | 358 | 294 |
|  |  | 50° C. | 329 | 276 | 253 |
|  |  | 60° C. | 205 | 179 | 211 |
|  |  | ΔT | 33% | 38% | 38% |
| Acceleration | Wear width (μm) |  | 40 | 25 | 35 |
| test | Chipping |  | Yes | No | No |
|  | Edge condition |  | Severely worn and edge absent | No chipping, but wear width great | No chipping, but wear width great |

The cleaning blades in the Examples and the Comparative Examples were each mounted on an acceleration test apparatus (an apparatus in which the blade is installed for an organic photoconductor, without involvement by a toner, at a pressure and an angle of contact comparable to those in an actual machine, and which is continuously rotated at a peripheral speed of 100 to 300 rpm), and brought into contact with the photoconductor. The acceleration test was run at room temperature (about 25° C.) for a period of time corresponding to the passage of 30,000 A4-size PPC sheets in portrait orientation (i.e., about 10 hours). Then, the edge of the cleaning blade was observed under magnification by a video microscope. The results are shown in Tables 1 and 2.

The cleaning blades of Examples 1 to 7, which had a tensile strength at 60° C. of 200 kg/cm² or more, and a tensile strength retention ΔT of 40% or more, were found to be minimal in the wear width and almost free from chipping, and were thus found to be usable satisfactorily for a long term. On the other hand, Comparative Example 1 with ΔT of less than 40% underwent chipping, and showed a large wear width. In Comparative Example 2 having a tensile strength at 60° C. of less than 200 kg/cm², and ΔT of less than 40%, and in Comparative Example 3 using polycarbonatediol as the polyol and having ΔT of less than 40%, no chipping occurred, but a great wear width was observed.

While the present invention has been described by the above embodiments, it is to be understood that the invention is not limited thereby, but may be varied or modified in many other ways. Such variations or modifications are not to be regarded as a departure from the spirit and scope of the invention, and all such variations and modifications as would be obvious to one skilled in the art are intended to be included within the scope of the appended claims.

What is claimed is:

1. A cleaning blade member comprising a polyurethane formed by using a polyol consisting essentially of a polycarbonatediol, a polyisocyanate consisting essentially of 4,4'-diphenylmethane diisocyanate (MDI), and a crosslinking agent containing a short chain diol and a triol, wherein the proportion of the polyisocyanate is 40 to 50 parts by weight based on 100 parts by weight of the polyurethane, and, said polyurethane having a tensile strength at 60° C. of 200 kg/cm² or higher, and a tensile strength retention ΔT, represented by the following equation, of 40% or more:

$$\Delta T(\%) = T_{60}/T_{10} \times 100$$

where $T_{10}$ denotes a tensile strength at 10° C., and $T_{60}$ denotes the tensile strength at 60° C.

2. The cleaning blade member according to claim 1, wherein the polyurethane has a tensile strength at 300% elongation at 60° C. of 200 kg/cm² or higher.

3. The cleaning blade member according to claim 1, wherein the polyurethane has a peak temperature at tan δ (1 Hz) of 10° C. or lower.

4. The cleaning blade member according to claim 1, wherein the short chain diol and the triol are at such a weight ratio that the short chain diol:triol=50:50 to 95:5.

5. The cleaning blade member according to claim 1, which has an α value of 0.7 to 1.0.

6. The cleaning blade member according to claim 1, which further uses a curing retarder.

7. The cleaning blade member according to claim 2, wherein the polyurethane has a peak temperature at tan δ (1 Hz) of 10° C. or lower.

8. The cleaning blade member according to claim 2, wherein the short chain diol and the triol are at such a weight ratio that the short chain diol:triol=50:50 to 95:5.

9. The cleaning blade member according to claim 3, wherein the short chain diol and the triol are at such a weight ratio that the short chain diol:triol=50:50 to 95:5.

* * * * *